Jan. 3, 1928.
J. F. CURTIS
1,654,680
SHAFT COUPLING
Filed July 27, 1925
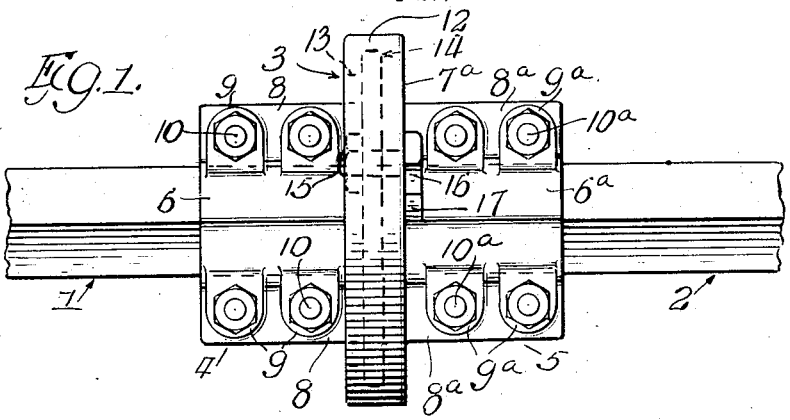
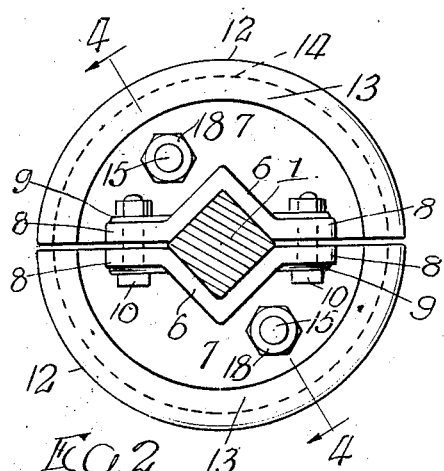
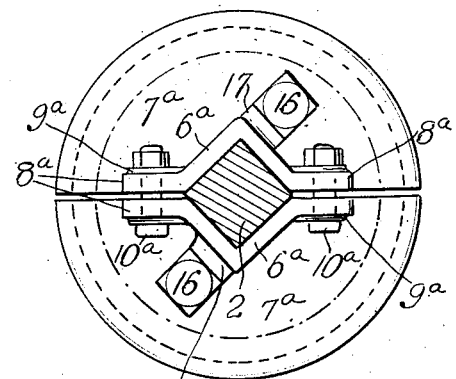
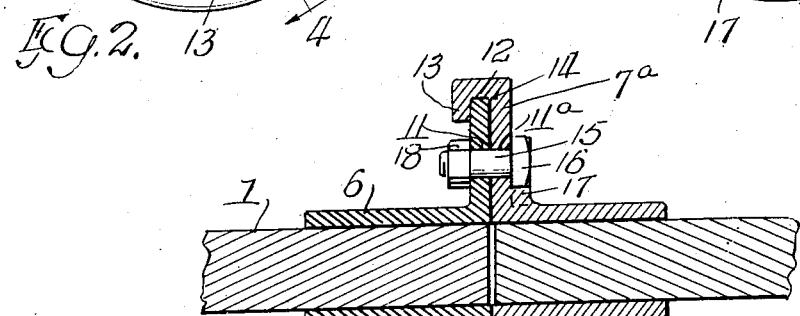
Inventor
John F. Curtis
by 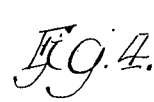 Atty.

Patented Jan. 3, 1928.

1,654,680

UNITED STATES PATENT OFFICE.

JOHN F. CURTIS, OF CHICAGO, ILLINOIS, ASSIGNOR TO O. F. JORDAN COMPANY, OF EAST CHICAGO, INDIANA, A CORPORATION OF INDIANA.

SHAFT COUPLING.

Application filed July 27, 1925. Serial No. 46,223.

This invention relates to improvements in shaft couplings and consists of the matters hereinafter described and more particularly pointed out in the appended claims, the subject matter hereof having first been disclosed in my prior U. S. Letters Patent on railroad spreaders Number 1,550,785, granted August 25, 1925.

The primary object of the invention is to provide a simple and efficient coupling by means of which two aligned shaft sections may be connected together to rotate as one or may be disconnected from each other to rotate independently and this without longitudinal separation between the coupling parts.

A further object of the invention is to provide a coupling made up in parts, which may be quickly attached to and detached from the respective ends of the shaft section without the necessity of slipping said parts onto and off said shaft sections from the ends thereof.

These objects of the invention as well as others, together with the many advantages thereof will more fully appear as I proceed with my specification.

In the drawings:

Fig. 1 is a top plan view of a shaft coupling embodying my invention.

Fig. 2 is a view in end elevation as viewed from one end of the coupling.

Fig. 3 is another view in end elevation as viewed from the other end of the coupling.

Fig. 4 is a longitudinal section through the same as taken on the line 4—4 of Fig. 2.

Referring now in detail to that embodiment of the invention illustrated in the accompanying drawings 1 and 2 indicate respectively, the substantially abutting ends of two aligned shaft sections which, as shown herein, are rectangular in cross section. 3 indicates as a whole my improved coupling which is made up of two coupling sections 4 and 5 secured, respectively, to said shaft sections 1 and 2 and operatively connected together so that one coupling section may be locked to the other or so that one coupling section may be disconnected from the other for relative rotative movement but not for longitudinal separation.

The coupling section 4 is made up of two identical parts each including a longitudinally extending sleeve portion 6 of angular cross section to fit the associated shaft end, with a radial flange portion 7 at one end thereof. Each sleeve portion has laterally extending flanges 8—8 at its sides, upon the outer surface of which are formed bosses 9—9, said flanges and bosses having suitable bolt openings therein. The sleeve portions 6—6 are adapted to embrace substantially one-half of the squared end of the associated shaft section 1 and when a pair of such coupling parts are placed on the end of said shaft section, their bolting flanges will approximately meet in the plane of the opposite corners thereof. Bolts 10—10 are employed and pass through the bolting flanges to securely clamp them together and onto said shaft section. In each radial flange portion is located a longitudinal hole 11 (see Fig. 4) thus providing two of such holes, diametrically oppositely disposed in said coupling section.

The coupling section 5 is also made up of two identical parts, similar in many respects to the parts of the coupling section 4, each part including a longitudinal sleeve portion $6^a$ of rectangular cross section to fit the associated shaft end, with a radial flange portion $7^a$ at one end thereof. Each sleeve portion $6^a$ has laterally extending flanges $8^a$—$8^a$ at its sides, upon the outer surface of which are formed bosses $9^a$—$9^a$, said flanges and bosses having suitable bolt openings therein. The sleeve portions $6^a$—$6^a$ are adapted to embrace substantially one half of the squared end of the associated shaft section 2 and when a pair of such coupling parts are placed on the end of said shaft section, their bolting flanges will approximately meet in the plane of the opposite corners thereof. Bolts $10^a$—$10^a$ are employed and pass through the bolting flanges to securely clamp them together and onto said shaft section. In each radial flange portion $7^a$ is located a longitudinal hole $11^a$ (see Fig. 4) thus providing two of such holes in said coupling section adapted to register with the holes 11 in the coupling section 4.

The radial flange portion $7^a$ of the parts of the coupling section 5 has an annular peripheral flange 12 that terminates in a short radial flange portion 13 spaced from the flange portion $7^a$ to provide a channel 14 to receive the flange portion 7 of the coupling section 4, the annular flange 12 and short radial flange portion 13 overhanging said flange portion 7 in a manner preventing longitudinal separation between the parts thereof. Bolts 15—15 are inserted through the registering holes 11—11$^a$ in the radial flange portions of the respective coupling sections and rotatively connect said sections together. The bolts are inserted in place, first through the flanges 7$^a$—7$^a$ and the heads 16 of said bolts engage with bosses 17 provided at the junction of the flanges 7$^a$ and sleeves 6$^a$ in a manner preventing rotation thereof, nuts 18 being threaded on said bolts and engaged directly with the flange portions 7 of the coupling section 4 and are thus located within the plane of the short radial flange portions 13.

When it is desired to connect the shaft sections 1 and 2 together so that they form in effect a single shaft, the bolts 15 are employed and when it is desired to have said shaft sections rotate independently, the one with respect to the other, said bolts are removed, the parts being secured against longitudinal separation as before described.

The improved shaft coupling is of special advantage in railroad spreader work as described in my Letters Patent hereinbefore referred to. The parts are so constructed that they may be applied to the shaft without the necessity of slipping them endwise upon the shaft and they may be as readily removed.

While in describing my invention I have referred to certain details of mechanical construction such as the squared shaft and sleeves of rectangular cross section, this is to be understood as by way of illustration only and not by way of limitation except as may be pointed out in the appended claim.

I claim as my invention:—

A shaft coupling for rectangular shaft sections comprising two coupling members, each consisting of a plurality of sleeve-like parts, each sleeve like part being rectangular to fit the shaft section and having bolting flanges at each side thereof, the sleeve-like parts of one member each having a radial flange at one end and the sleeve-like parts of the other member also each having a radial flange at the associated end with a peripheral flange embracing and overhanging the peripheral portion of the first mentioned radial flange, there being longitudinal holes in said radial flanges adapted to be brought into register and to receive bolts for rotatively securing said coupling members together, said peripheral flange preventing longitudinal separation between said coupling members independent of said bolts.

In testimony whereof, I have hereunto set my hand, this 22nd day of July, 1925.

JOHN F. CURTIS.